Aug. 11, 1925.

R. A. BATES

STEERING WHEEL LOCK

Filed July 16, 1923     3 Sheets-Sheet 1

1,549,568

Inventor
Russell A. Bates
By Frank E. Liverman, Jr.
Attorney.

Aug. 11, 1925.  1,549,568

R. A. BATES

STEERING WHEEL LOCK

Filed July 16, 1923  3 Sheets-Sheet 3

Inventor
Russell A. Bates
By Frank E. Liverance Jr.
Attorney

Patented Aug. 11, 1925.

1,549,568

UNITED STATES PATENT OFFICE.

RUSSELL A. BATES, OF GRAND RAPIDS, MICHIGAN, ASSIGNOR TO NEHER-BATES MANUFACTURING COMPANY, OF GRAND RAPIDS, MICHIGAN, A CORPORATION OF MICHIGAN.

STEERING-WHEEL LOCK.

Application filed July 16, 1923. Serial No. 651,763.

*To all whom it may concern:*

Be it known that I, RUSSELL A. BATES, a citizen of the United States of America, residing at Grand Rapids, in the county of Kent and State of Michigan, have invented certain new and useful Improvements in Steering-Wheel Locks; and I do hereby declare the following to be a full, clear, and exact description of the invention, such as will enable others skilled in the art to which it appertains to make and use the same.

This invention relates to improvements in automobile steering wheel locks and its principal object is to provide a simple and effective lock by means of which the steering wheel may be locked in operative connection with the steering gear and also to disconnect the steering wheel from the steering gear and lock it so that it may not be reconnected without insertion of the proper key.

To conform with police regulation in many cities and also for the sake of safety, the automobile when locked, should be in condition to be moved a short distance in case of emergency. The device embodying this invention, while disconnecting the steering wheel from the steering gear and making it impossible to steer the automobile to drive it away, still permits the vehicle to be moved a short distance, the steering in this emergency being done by turning the front wheels direct, they being free to be moved.

The locking device shown in the accompanying drawing is applied to a particular type of steering wheel which is adapted to be heated by means of exhaust gas from the engine passing through chambers and passages therein. It is not essential that the lock be applied to this particular type of steering wheel as it will function equally well upon an ordinary steering wheel not having the heated feature.

The locking device is provided with various novel features of construction and arrangement as hereinafter more fully described and particularly pointed out in the claims, reference being had to the accompanying drawings in which:

Like reference numerals apply to like parts in all of the figures.

Figure 1:
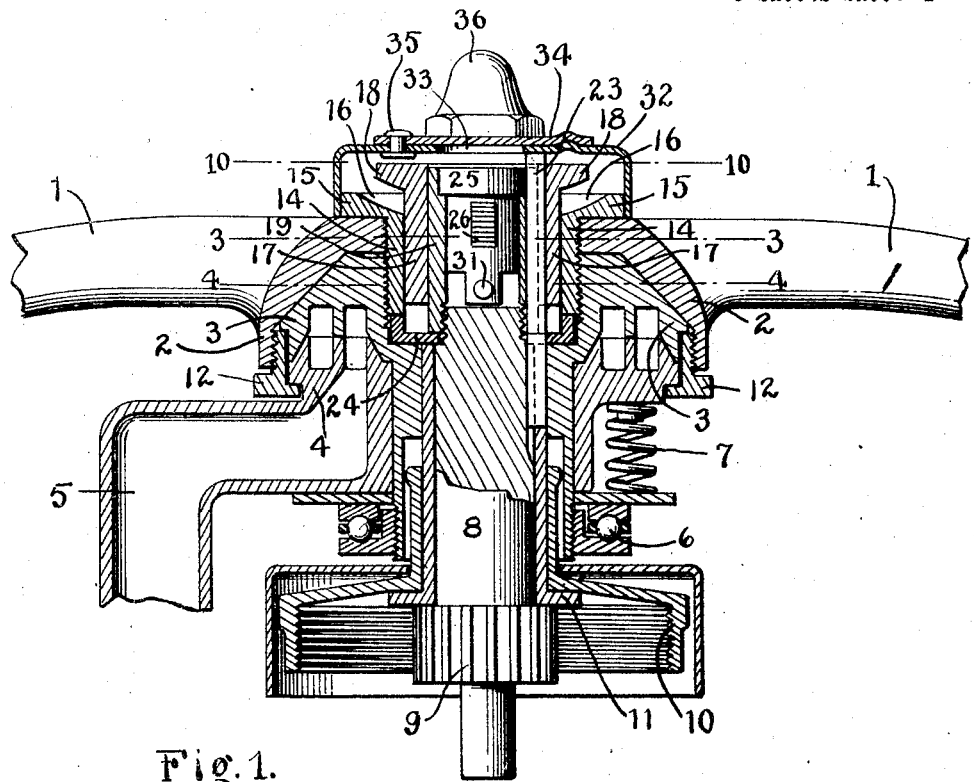
Fig. 1 is an axial sectional elevation of the locking device properly applied to the steering wheel and in disconnected position a fragment of the wheel and a portion of the steering gear being shown.
Figure 2:
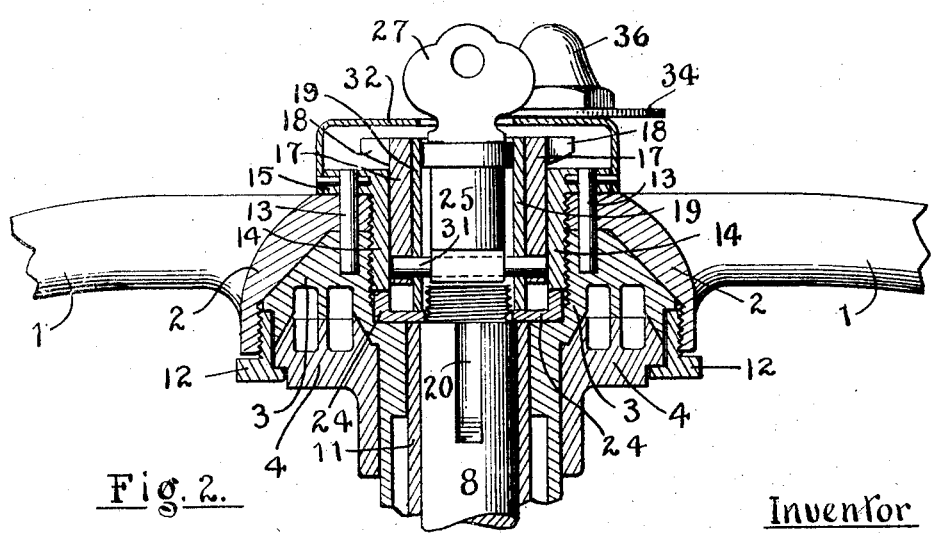
Fig. 2 is a sectional elevation of the upper portion of the locking device taken on a plane at right angles to Fig. 1.
Figure 3:
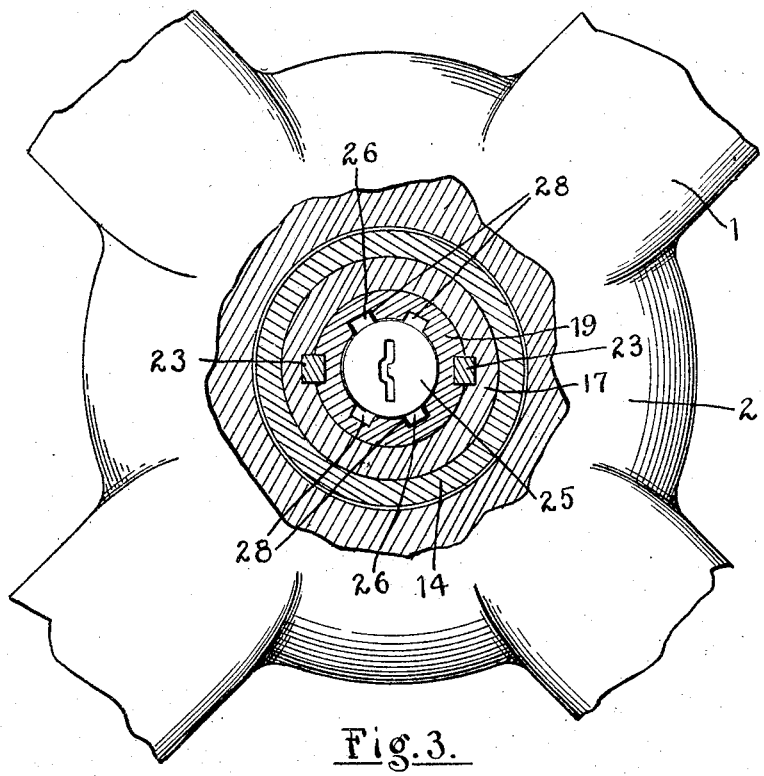
Fig. 3 is a fragmentary section on the line 3—3 of Fig. 1.
Figure 4:
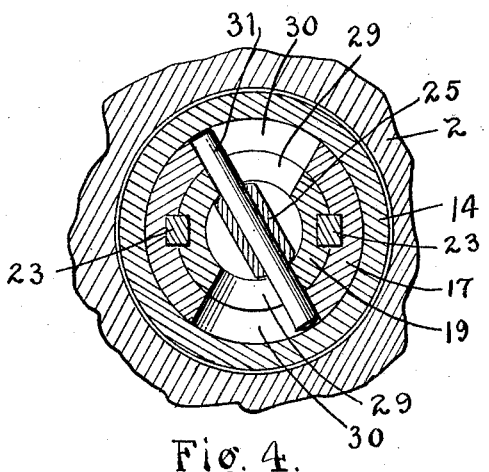
Fig. 4 is a fragmentary section on the line 4—4 of Fig. 1.
Figure 5:
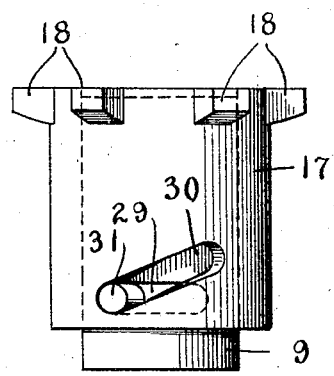
Fig. 5 is an elevation of the locking sleeve and lock receptacle which form a part of the structure.
Figure 6:
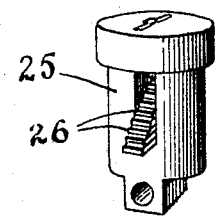
Fig. 6 is a perspective view of the lock element.
Figure 7:
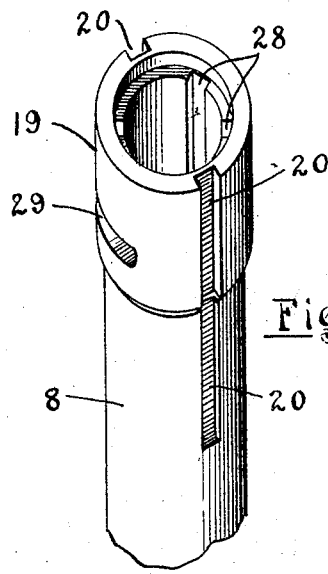
Fig. 7 is a perspective view of the lock receptacle and the upper portion of the steering shaft.
Figure 8:
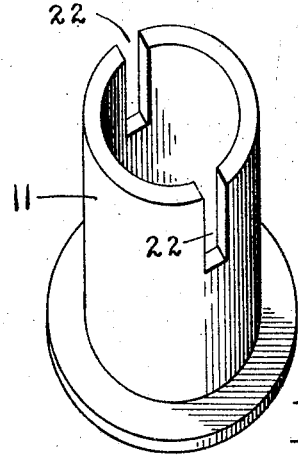
Fig. 8 is a perspective view of the steering shaft bushing.
Figure 9:
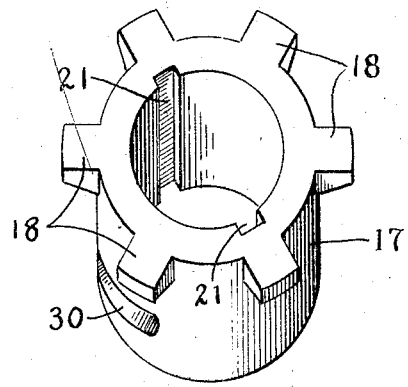
Fig. 9 is a perspective view of the locking sleeve.
Figure 10:
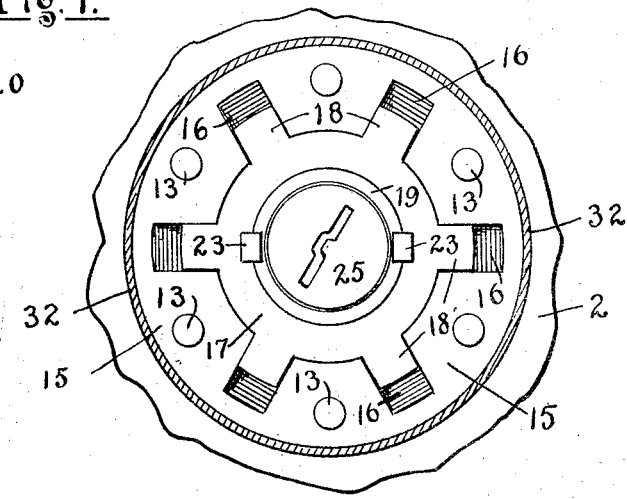
Fig. 10 is a sectional plan on the line 10—10 of Fig. 1.

1 represents the steering wheel having a hub 2. The hub 2 is provided with a certain chambered member 3 which registers with a corresponding chambered member 4 having a passage 5 to admit exhaust gas from the engine to heat the steering wheel. The ball-bearing 6 and spring 7, are also associated with the said chambered members 3 and 4, none of which are essential to the locking device embodying this invention.

8 is the steering shaft and as herein shown, it is provided at its lower end with a gear 9 which is one of the steering gears, the rotation of which moves the front wheels of the vehicle. 10 is the cap of the steering gear housing in which the steering shaft bushing 11 is journaled. The chambered member 3 is fastened into the hub 2 of the steering wheel by the threaded ring 12 and the dowel pins 13, and may be considered as a part of the steering wheel hub.

Into the top of the hub 2, is screwed the bushing 14 which has a flange 15 extending over the top surface of the hub and in the top surface of the said flange a plurality of radial recesses 16 are provided. The locking sleeve 17 fits into the bushing 14, being vertically slidable therein and it is provided at its upper end with a plurality of radial lugs 18 which are adapted when the locking sleeve is lowered to enter the radial recesses 16 and lock the two members together.

The lock receptacle 19 is screwed on to the upper end of the steering shaft 8 and is cylindrical in shape and fits into the locking sleeve 18. Key ways 20 are cut in diametrically opposite sides and on the outer surfaces of the lock receptacle 19 and the steering shaft 8 and corresponding keyways 21 are cut on the inner surface of the locking sleeve 17 and slots 22 serving as key ways are provided in the upper end of the steering shaft bushing 11. When the locking device is assembled, the keys 23, only one of which is shown in Fig. 1 of the drawing, are inserted in these key ways which cause the members 8, 11, 17 and 18 to rotate together.

The cupped washer 24 is clamped between the end of the bushing 11 and the lock receptacle 19 retains the steering wheel in position preventing it from being lifted off the bushing 11.

The lock element 25 is of an ordinary construction being cylindrical in shape and having extensible bolts 26 which are retracted within the body of the lock by insertion of a key 27 and which automatically extend beyond the body when the key is removed. The said lock element fits into the lock receptacle 19, the interior of which is provided with two sets of diametrically opposite grooves 28 which receive the extended bolts 26 in either of two positions of the lock element.

The lock receptacle 19 is provided near its lower end with two diametrically opposite horizontal arcuate slots 29, and the locking sleeve 17 is provided near its lower end with two diametrically opposite inclined arcuate slots 30. A hole is provided in the lower end of the lock element through which a pin 31 extends its opposite ends extending through the said opposite arcuate slots 29 and 30. Rotation of the lock member together with the pin 31 will cause vertical movement of the locking sleeve 17. A cap 32 fits over the flange 15 of the bushing 14 and is provided in its center with an opening 33 through which the key 27 may be inserted and a swinging cover 34 pivoted at 35 to the cap, closes the opening 33 and may have attached to it an imitation cap nut 36 to disguise its real purpose.

The operation of the device is as follows:

When the wheel is operatively connected to the steering shaft, the locking sleeve 17 is lowered so that the radial lugs 18 thereon are within the radial recesses 16 of the flanged bushing 14. The said flanged bushing is immovably connected to the steering wheel by the dowel pins 13 which pass through its flange 15 and the locking sleeve 17 is connected by means of the keys 23 to the steering shaft 8. Thus when the members 17 and 14 are connected by the lugs 18 in the recesses 16, the steering wheel and steering shaft are connected and rotate together.

In connected position as above described, the lock element having the pin 31 at its lower end, is turned to one of its extreme positions, the said pin 31 in the slot 30 of the locking sleeve retaining the sleeve in lowered position and when the key 27 is withdrawn from the lock element the bolts 26 will extend into two opposite grooves 28 and thus retain the parts in this relative position.

To disconnect the steering wheel from the steering shaft, the key 27 is inserted in the lock element which retracts the bolts 26 and permits the lock element to be rotated in its receptacle 19. The lock element is then rotated by means of the key 27 and as it rotates the pin 31 traversing the inclined slot 30 in the locking sleeve will move the said sleeve upward until the lugs 18 on it are disengaged from the bushing 14. In this position there is no positive connection between the steering wheel and the steering shaft, and either is free to rotate irrespective of the other. By withdrawing the key 27 when the parts are in disconnected position, the bolts 26 extend into the second pair of slots 28 and thus lock the device in disconnected position.

It will be seen that the operation of this device is very simple, convenient and effective. The automobile driver has only to insert the proper key and turn it slightly from one position to another to either connect or disconnect the steering wheel from the steering shaft. By withdrawing the key, the wheel is positively locked in either connected or disconnected position. When connected it is just as firmly attached and operative as though it were fastened directly to the steering shaft by the usual key and nut and when disconnected it is absolutely free to rotate and likewise the front wheels are free to be turned in any direction, so that there is no danger of breaking the lock by straining upon either the steering gear or steering wheel.

This locking device may be conveniently embodied in a heated steering wheel as before mentioned, or it may be just as effectively built into a non-heated steering wheel of ordinary structure.

I claim:

1. A steering wheel lock comprising a steering shaft, a hollow cylindrical lock receptacle upon the upper end of the steering shaft said lock receptacle having a horizontal arcuate slot therein, a locking member vertically slidable upon the lock receptacle and rotating with said receptacle and shaft and having an inclined cam slot therein, lugs on said locking member, a steering wheel mounted on said steering shaft and having recesses to receive the said lugs on the locking member, a lock element rotatable in the lock receptacle and having a pin extending through the horizontal arcuate slot and into the cam slot whereby rotation of the lock element will raise or lower the locking member.

2. A steering wheel lock comprising a steering shaft having a keyway, a cylindrical lock receptacle upon the upper end of the shaft having a corresponding keyway and also having a horizontal arcuate slot, a locking sleeve vertically slidable upon the lock receptacle and having a keyway, a key inserted in said keyways whereby the shaft, lock receptacle, and locking sleeve are caused to rotate together, a steering wheel mounted upon the shaft and having recesses in its upper surface, lugs on the locking sleeve adapted to enter said recesses, and a lock element rotatable within the lock receptacle and having a pin extending through said arcuate slot and into the cam slot whereby rotation of the lock element will cause a vertical movement of the locking sleeve.

3. A steering wheel lock comprising a steering shaft having a keyway, a hollow cylindrical lock receptacle mounted on the upper end of the shaft and having a corresponding keyway and a horizontal arcuate slot and also having vertical grooves on its inner surface, a locking sleeve surrounding the lock receptacle and vertically slidable thereon and having a keyway on its inner surface and a cam slot, a key in said keyways which causes the shaft, lock receptacle, and sleeve to rotate together, lugs on the locking sleeve, a steering wheel mounted upon the steering shaft and having recesses in its upper surface to receive the said lugs, a lock element rotatably mounted in the lock receptacle and having extensible bolts retracted by a key and adapted when extended to enter a vertical groove on the interior of the lock receptacle, and a pin fixed to the lock element and extending through the horizontal arcuate slot and into the cam slot whereby rotation of the lock element will cause vertical movement of the locking sleeve.

4. A steering wheel lock comprising a steering shaft having a keyway, a steering wheel mounted upon the shaft and having a threaded opening in its upper surface, a bushing screwed into said threaded opening and pinned to the steering wheel said bushing having recesses in its upper surface, a hollow lock receptacle screwed on to the upper end of the steering shaft and having a keyway in its outer surface, a plurality of grooves in its inner surface and a horizontal arcuate slot, a washer lying within the threaded opening in the steering wheel and engaging the bottom of said opening and the lower end of the bushing therein and being clamped between the steering shaft and lock receptacle, a locking sleeve surrounding the lock receptacle and having a keyway in its inner surface and a cam slot, lugs on the locking sleeve adapted to enter the recesses on the threaded bushing, a key inserted into the keyways of the steering shaft, lock receptacle, and locking sleeve whereby the said members are caused to rotate together, a lock element rotatable in the lock receptacle and having extensible bolts retracted by a key and adapted when extended to enter one of the vertical grooves in the interior of the lock receptacle and a pin fixed to the lock element and extending through said arcuate slot and into said cam slot whereby rotation of the lock element causes vertical movement of the locking sleeve.

5. A steering wheel lock comprising a steering shaft having a keyway, a bushing surrounding said shaft and having a key slot in its upper end, a steering wheel mounted upon said bushing and having a threaded opening in its upper surface, a bushing screwed into said threaded opening and pinned to the steering wheel said bushing having recesses in its upper surface, a hollow lock receptacle screwed on to the upper end of the steering shaft and having a keyway in its outer surface, a plurality of grooves in its inner surface and a horizontal arcuate slot, a washer lying within the threaded opening in the steering wheel and engaging the bottom of said opening and the lower end of the bushing therein and being clamped between the steering shaft and lock receptacle, a locking sleeve surrounding the lock receptacle and having a keyway in its inner surface and a cam slot, lugs on the locking sleeve adapted to enter the recesses on the threaded bushing, a key inserted into the keyways of the steering shaft, lock receptacle, and locking sleeve whereby the said members are caused to rotate together, a lock element rotatable in the lock receptacle and having extensible bolts retracted by a key and adapted when extended to enter one of the vertical grooves in the interior of the lock receptacle and a pin fixed to the lock element and extending through said arcuate slot and into said cam slot whereby rotation of the lock element causes vertical movement of the locking sleeve.

RUSSELL A. BATES.